United States Patent
Barajas Gonzalez et al.

(10) Patent No.: US 11,082,507 B2
(45) Date of Patent: *Aug. 3, 2021

(54) INTEGRATION OF SOCIAL INTERACTIONS INTO MEDIA SHARING

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 15/235,272

(22) Filed: Aug. 12, 2016

(65) Prior Publication Data

US 2018/0048721 A1 Feb. 15, 2018

(51) Int. Cl.
*G06F 16/248* (2019.01)
*G06F 3/0482* (2013.01)
(Continued)

(52) U.S. Cl.
CPC ............ *H04L 67/22* (2013.01); *G06F 3/0481* (2013.01); *G06F 3/0482* (2013.01);
(Continued)

(58) Field of Classification Search
CPC ......... G06F 17/30867; G06F 17/30241; G06F 17/30386; G06F 17/30371; G06F 17/30489; G06F 17/30554; G06F 17/30064; G06F 17/3053; G06F 17/30722; G06F 17/30247; G06F 17/30265; G06F 17/30598; G06F 17/30; G06F 16/38; G06F 16/9535; G06F 16/24556; G06F 16/2365; G06F 16/248;
(Continued)

(56) References Cited

U.S. PATENT DOCUMENTS

| | | | |
|---|---|---|---|
| 5,717,468 A | * | 2/1998 | Baryla ................. G11B 27/034 345/636 |
| 8,825,759 B1 | | 9/2014 | Jackson et al. |

(Continued)

OTHER PUBLICATIONS

List of IBM Patents or Patent Applications Treated as Related dated Aug. 16, 2016 (2 pages).

*Primary Examiner* — Alford W Kindred
*Assistant Examiner* — Cecile H Vo
(74) *Attorney, Agent, or Firm* — Griffiths & Seaton PLLC

(57) ABSTRACT

Embodiments for integration of social interactions in shared media by a processor. The social interactions are mapped in real time according to a predetermined preference. Duplicate ones of the social interactions are managed according to a data deduplication operation. The shared media is analyzed in view of the mapped social interactions to generate placement or duration display attributes for the social interactions such that the mapped social interactions and the shared media may be concurrently viewed on a particular display without obfuscating content of the shared media at a particular time.

20 Claims, 9 Drawing Sheets

(51) Int. Cl.
*H04L 29/08* (2006.01)
*G06F 16/23* (2019.01)
*G06F 16/9535* (2019.01)
*G06F 16/2455* (2019.01)
*G06F 3/0481* (2013.01)
*G06F 16/215* (2019.01)
*G06F 16/9032* (2019.01)

(52) U.S. Cl.
CPC ........ *G06F 16/215* (2019.01); *G06F 16/2365* (2019.01); *G06F 16/248* (2019.01); *G06F 16/24556* (2019.01); *G06F 16/90332* (2019.01); *G06F 16/9535* (2019.01); *H04L 67/1097* (2013.01); *H04L 67/18* (2013.01); *H04L 67/306* (2013.01)

(58) Field of Classification Search
CPC ................. G06F 3/0482; G06F 16/215; G06F 16/90332; G06F 16/358; G06Q 50/01; G06Q 30/0269; H04L 67/22; G11B 27/34; G11B 27/031
USPC ......... 707/758, 803, E17.014, E17.069, 723, 707/749, 769, 319, E17.01; 705/319
See application file for complete search history.

(56) References Cited

U.S. PATENT DOCUMENTS

| | | | |
|---|---|---|---|
| 9,432,421 B1* | 8/2016 | Mott | ..................... H04W 4/025 |
| 9,542,428 B2* | 1/2017 | Kemp | ..................... G06F 16/23 |
| 9,672,827 B1 | 6/2017 | Jheeta | |
| 2005/0038533 A1 | 2/2005 | Farrell et al. | |
| 2008/0250106 A1 | 10/2008 | Rugg et al. | |
| 2010/0100904 A1 | 4/2010 | Kawakami et al. | |
| 2012/0259926 A1 | 10/2012 | Lockhart | |
| 2013/0031162 A1* | 1/2013 | Willis | ................ H04L 65/1069 709/203 |
| 2013/0226758 A1 | 8/2013 | Reitan | |
| 2014/0019443 A1* | 1/2014 | Golshan | ............ G06F 16/24578 707/723 |
| 2014/0059675 A1 | 2/2014 | Batie, Jr. et al. | |
| 2015/0304253 A1* | 10/2015 | Lee | ........................ G09G 5/006 709/206 |
| 2015/0370830 A1 | 12/2015 | Murphy-Chutorian et al. | |
| 2016/0094680 A1* | 3/2016 | Lu | ........................... H04L 67/02 709/218 |
| 2016/0110333 A1 | 4/2016 | Brunn et al. | |
| 2018/0046718 A1 | 2/2018 | Barajas Gonzalez et al. | |
| 2018/0048615 A1 | 2/2018 | Barajas Gonzalez et al. | |
| 2018/0048721 A1 | 2/2018 | Barajas Gonzalez et al. | |
| 2018/0246973 A1 | 8/2018 | Zhao | |

\* cited by examiner

US 11,082,507 B2

INTEGRATION OF SOCIAL INTERACTIONS INTO MEDIA SHARING

BACKGROUND OF THE INVENTION

Field of the Invention

The present invention relates in general to computing systems, and more particularly to, various embodiments for managing social interactions within the context of shared media by a processor.

Description of the Related Art

The emergence, growth, and proliferation of so-called "social media" has been somewhat of a phenomenon. A prominent form of media consumption and social interaction that is often integrated into many social media applications is that of shared media, such as videos of a particular subject that allow for collective commenting. As the market for shared media has continued to expand, collective commenting has increased in prominence to become a focal point of interest, often times resulting in users devoting more time browsing the comments and socially interacting than viewing the shared media.

SUMMARY OF THE INVENTION

Various embodiments for integration of social interactions in shared media by a processor are provided. In one embodiment, by way of example only, a system for integrating social interactions in shared media is provided. The social interactions are mapped in real time according to a predetermined preference. Duplicate ones of the social interactions are managed according to a data deduplication operation. The shared media is analyzed in view of the mapped social interactions to generate placement or duration display attributes for the social interactions such that the mapped social interactions and the shared media may be concurrently viewed on a particular display without obfuscating content of the shared media at a particular time.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
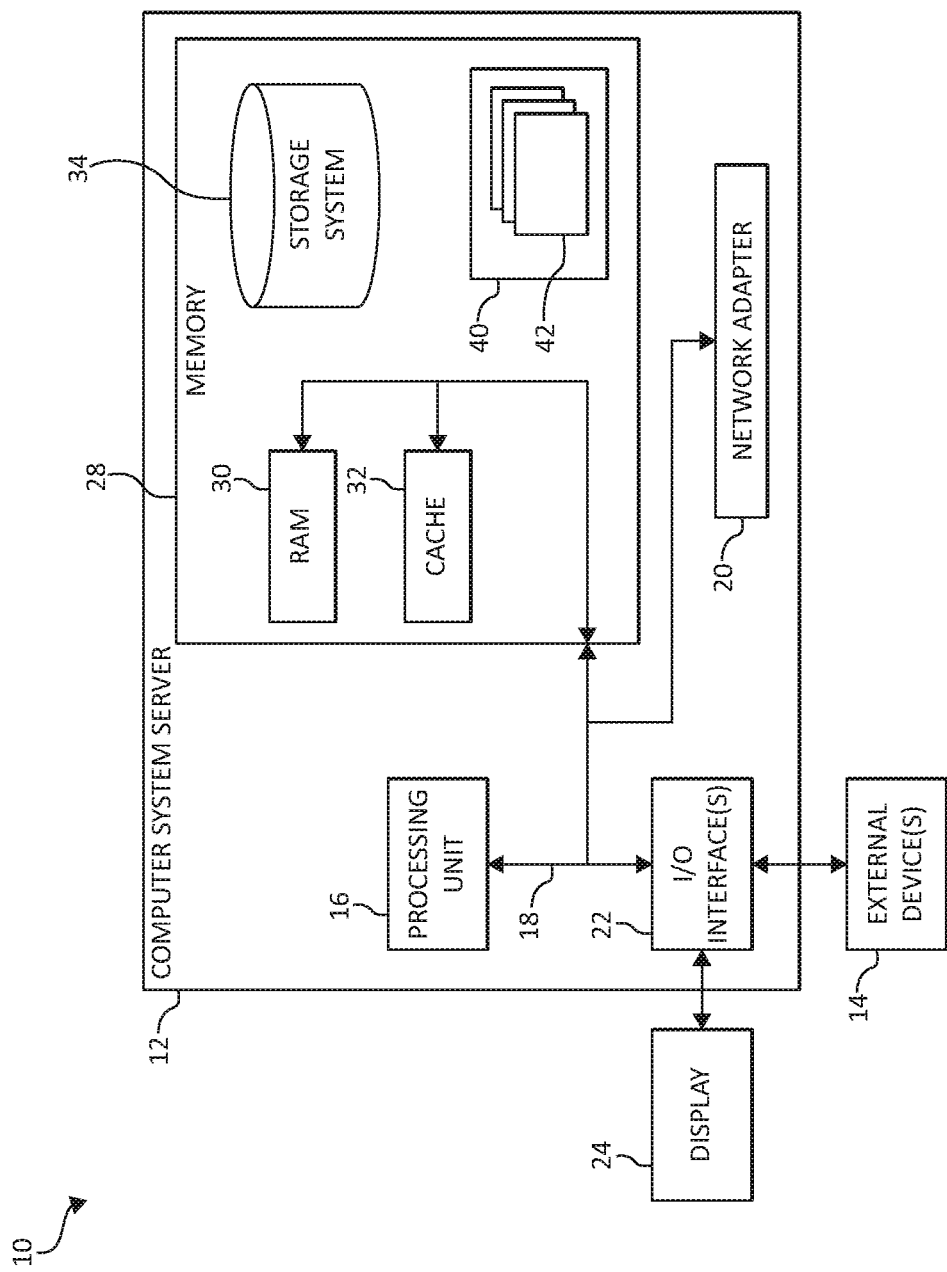
FIG. 1 is a block diagram depicting an exemplary cloud computing node according to an embodiment of the present invention.

In conventional settings where shared media is presented with accompanying social interaction, such as a video posted on a social network with accompanying comments, the shared media in general is compartmentalized apart from the commentary. Comments, in these scenarios, were initially implemented to be additive in nature, rather than designed as an integral part of the social video sharing platform. As the popularity of shared media has increased, and with it, the number of users that may view a particular video (for example, a video that has "gone viral" in nature), this compartmentalization of media and additive commentary may become burdensome for the user, as the user may be relegated to pursuing comments as a separate activity. This scenario may result, for example, in the user resorting to scroll through hundreds, sometimes thousands, of comments and then back to the shared media to have some idea of what the commentary is referencing in relation to the media.

A need exists for a mechanism whereby social interactions and shared media may be integrated, so that a user may participate in the social interactions and commentary yet also continue to view the presentation of the associated shared media, and the overall experience for the user is thereby enriched.

In view of the foregoing, the mechanisms of the illustrated embodiments provide for solutions to the aforementioned compartmentalization of media and social interaction to the benefit of the participating user. To wit, the illustrated embodiments herein provide mechanisms for displaying and embedding relevant and coherent social commentary within social media video environments as managed by a processor device. These mechanisms implement the insertion of the social interactions (e.g., comment insertion) of desired or relevant social interactions based on various preferences (such as user preferences) within and concurrently displayed with the shared media in a single display frame, or within or in close proximity with, the display frame of the shared media.

In one embodiment, the mechanisms of the present invention analyze the video content and/or the social interactions when determining the layout of the concurrently displayed commentary and shared media, such that display of the social interactions does not obfuscate view by the user of the content of the shared media. For example, the shared media may be analyzed in a variety of ways to determine layout, placement, duration, style (e.g., font size or color), or other determinations for appropriately and effectively rendering the social commentary in conjunction with the shared media content.

In addition to analyzing shared media for determining effective placement of the social interactions, the mechanisms of the illustrated embodiments also analyze the social interactions themselves for various qualities and characteristics as will be further described. Each of the characteristics of the social interactions are used to determine such aspects as the relevance of the social interactions to the shared media, the quality of the social interactions, and the popularity of the social interactions. Again, various preferences (such as user preferences) may be used to rank the social interactions, organize the social interactions, and as will be further described, filtering operations to weed out those interactions determined to be irrelevant, inappropriate, or even offensive to the user.

In one embodiment, the mechanisms of the illustrated embodiments may incorporate various deduplication operations on the social interactions, such that those interactions determined to be duplicates are processed in a similar manner as duplicate data in a deduplication operation. The duplicate interactions then are withheld from being presented to the user, enriching the viewing experience by only presenting original interactions. The duplicate interaction information also has an attendant benefit of being used by the mechanisms of the illustrated embodiments to rate the social interactions for a certain characteristic. For example, a certain comment that is found to have many duplicates in a comment thread may indicate the level of popularity, or relevancy, of the comment to viewers of the shared media as a whole. Accordingly, the deduplication information may also be used, along with the preferences information and analysis information, to organize the social interactions for presentation to a particular user.

As previously indicated, the mechanisms of the illustrated embodiments may analyze the shared media to determine placement decisions. In one embodiment, for example, the mechanisms of the illustrated embodiments may analyze the shared media to determine the temporal location of when a particular social interaction should be best displayed. During analysis of the shared media content, locations within the media that would be most appropriate for injection of the social interactions may be determined and mapped in order to avoid overlays that would obscure what are determined to be important aspects of the shared media.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
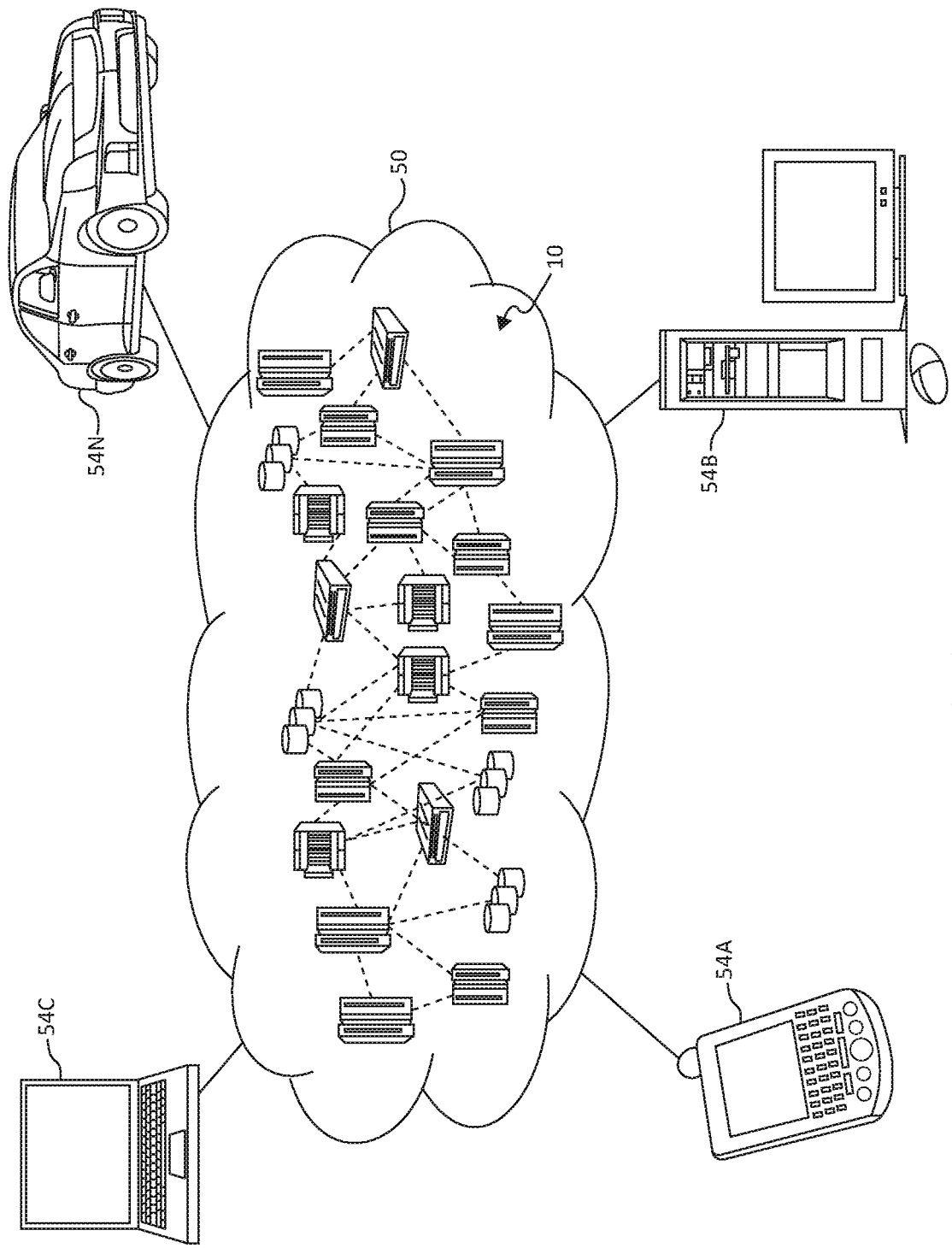
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
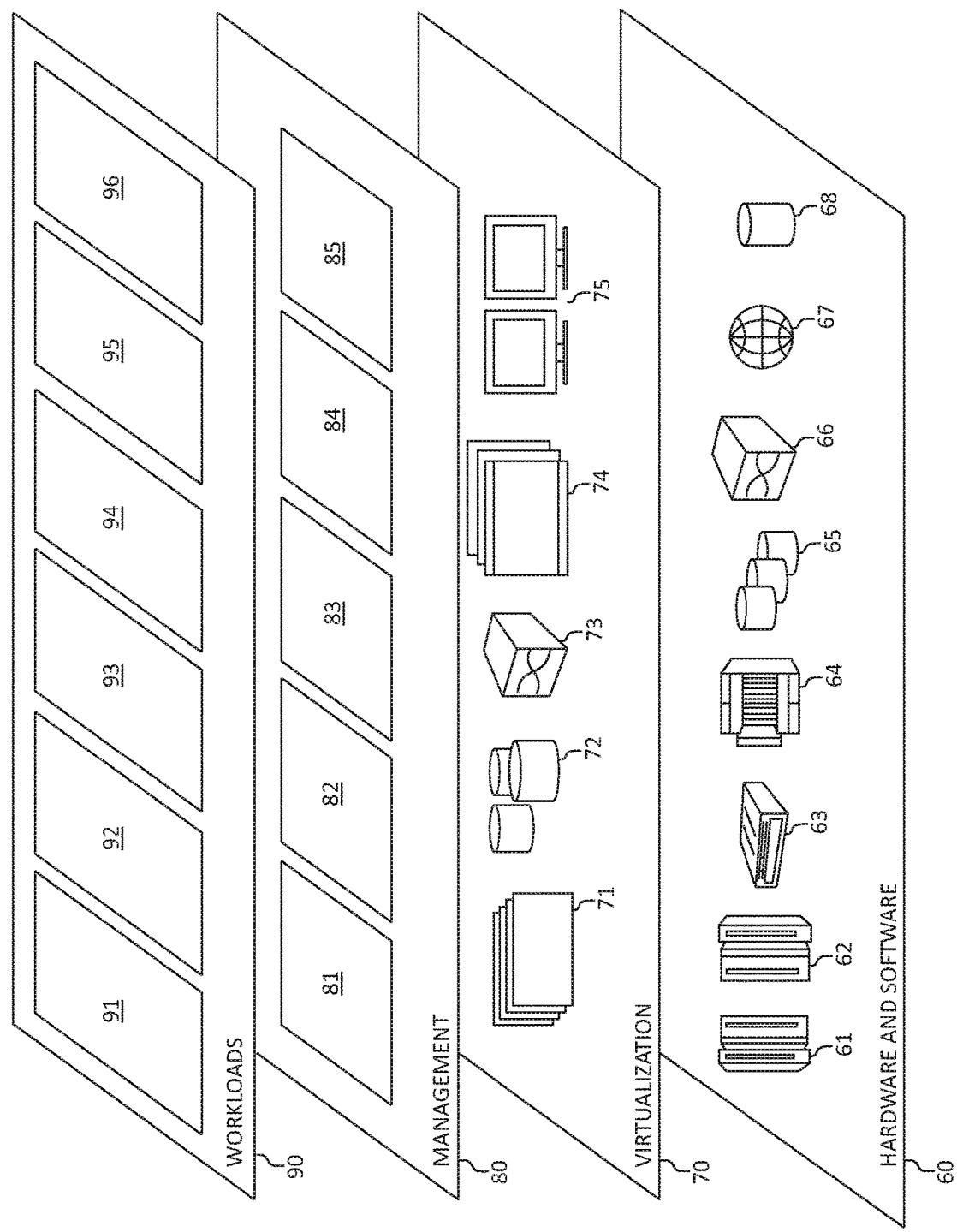
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various social interaction workloads and functions 96. In addition, social interaction workloads and functions 96 may include such operations as media analytics, metadata analysis, and as will be further described, display management functions. One of ordinary skill in the art will appreciate that the data deduplication workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
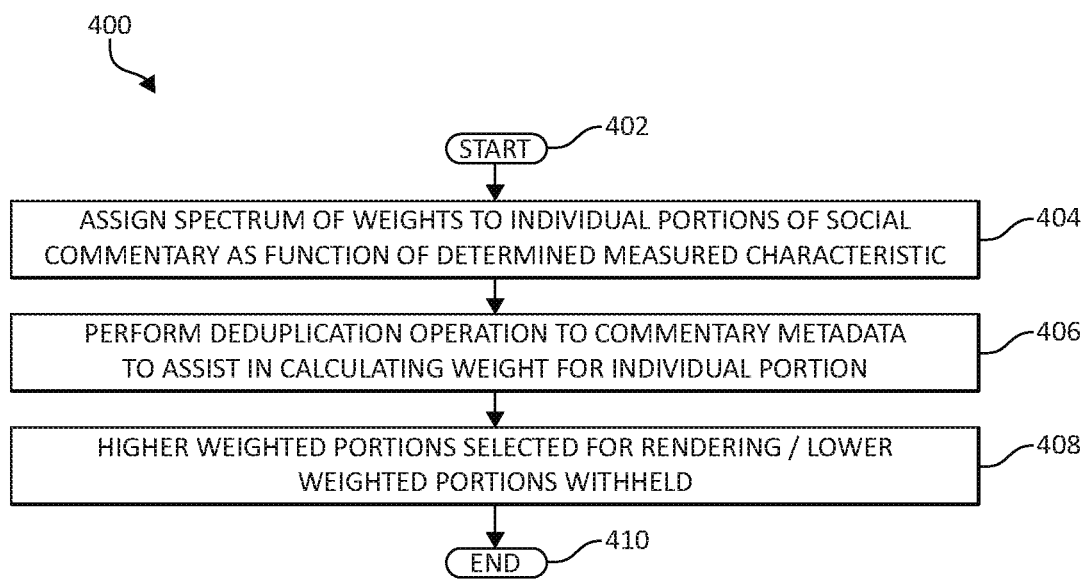
FIG. 4 is a flowchart diagram depicting an exemplary method for integrating social interactions with shared media by a processor, in which various aspects of the illustrated embodiments may be realized.

Turning now to FIG. 4, an exemplary method 400 for management of social interactions in the context of shared media by a processor is depicted, in which various aspects of the present invention may be implemented. Method 400 begins (step 402) with the assignment of a spectrum of weights to individual portions of social commentary as a function of a determined measured characteristic (step 404).

In a subsequent step 406, a deduplication operation is performed to commentary metadata to assist in calculating particular weights for each individual portion. In the context of the illustrated embodiment, higher weighted portions (e.g., above a predetermined weight threshold) may then be selected for rendering/display to the user, while other, lower weighted portions (e.g., lower than the predetermined weight threshold) may be withheld from display (step 408). The method 400 then ends (step 410).

Figure 5:
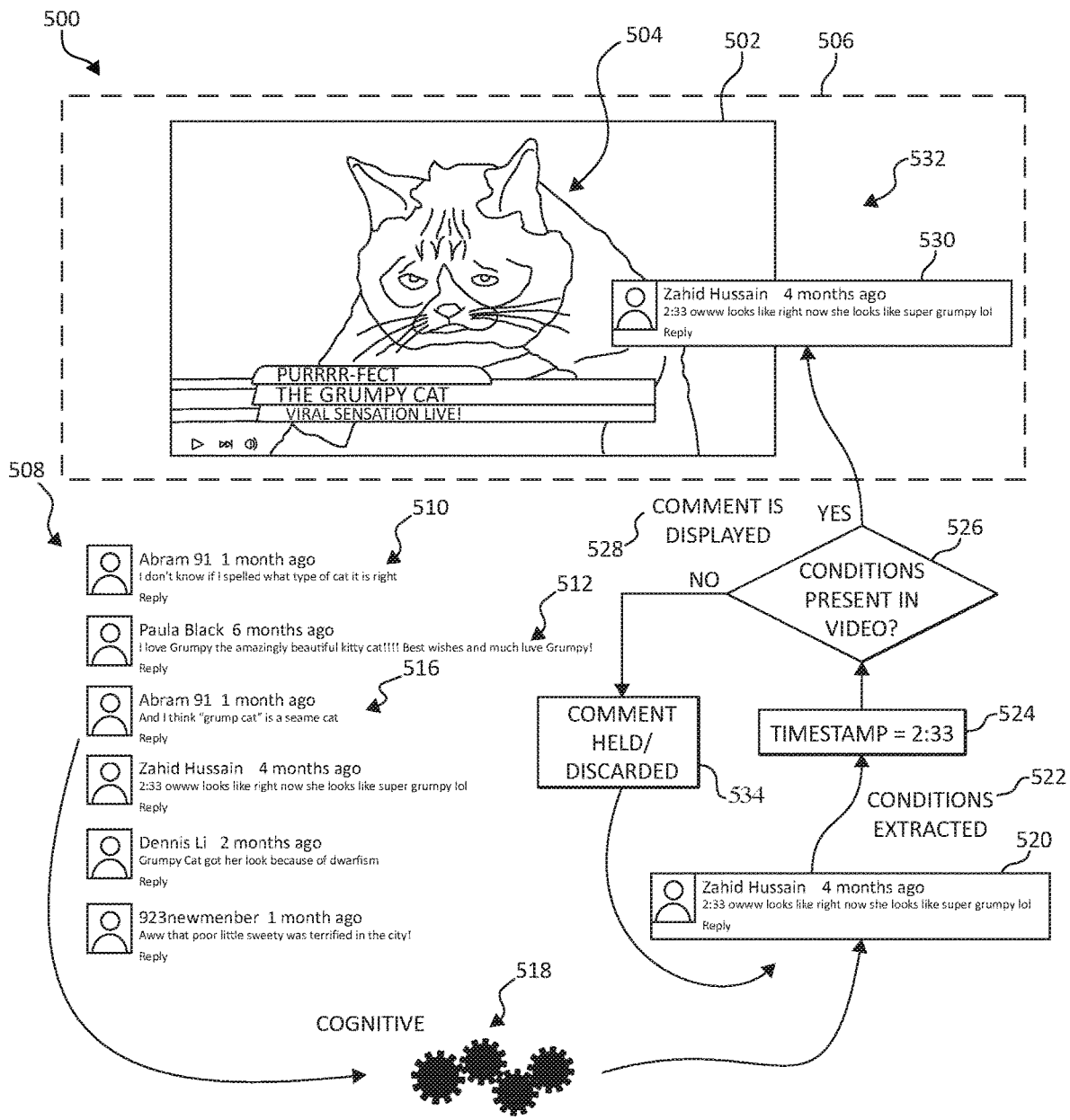
FIG. 5 is a block/flow diagram depicting an exemplary flow of social interactions integrated with shared media by a processor, again in which various aspects of the illustrated embodiments may be realized.

FIG. 5, following, is a block/flow chart diagram depicting an additional exemplary embodiment 500 for management of social interactions/social commentary in the context of shared video, here again in which various aspects of the present invention may be realized. In the depicted embodiment, a display frame 506 is shown having shared media 502 accompanied by related comments 508. The subject of the shared media concerns a furry animal 504 whose behavior has triggered an apparent viral internet phenomenon, with a number of continually increasing comments from fans across the world.

As one of ordinary skill in the art will appreciate, the ordering and display of the related comments 508 typically is performed in chronological order (i.e., when the comments were posted), along with reply comments to an original commenter. Comments 510, 512, and 516 are a subset of perhaps thousands of comments that are received by, and posted for, this particular shared media 502.

In the depicted embodiment, comments are collected and weighted. The comment weighting may be performed as a function of any number of determined measured characteristics. As will be further described, the comments themselves may be cognitively analyzed for certain terms, themes, repetition, style, and other characteristics. Any or all of these characteristics, along with in some embodiments, information gleaned from the user's own preferences, may be used to weight individual comments in the overall comment thread.

In one embodiment, comments are collected and weighted in terms of optional "favorite" and "like" characteristics. As further comments are received, as well as additional "favorite" and "like" characteristics are received, the weighting may increase or decrease as a function of the overall weighting algorithm used in a particular scenario. Previous likes made of similar comments of other shared media may be analyzed. As previously mentioned, information may also be obtained from a user profile to indicate user preferences, such as an aversion to profanity or comments determined to be politically themed.

As shown in FIG. 5, a so-called "cognitive operation" is performed on the weighted comments as referenced by step 518. The cognitive operation may include a wide variety of analytical functionality, but all designed to examine the content of the social interactions and shared media to obtain contextual information about the social interaction.

In one embodiment, the cognitive operation is performed on all comments to provide a meaningful understanding of the comments beyond standard dictionary definitions. The benefit of performing a cognitive operation lies in the fact that many languages, including English, include words that may have significantly different meanings based upon the context that the words are used. In addition to the social interactions, a cognitive interpretation may occur on the audio portion of video-based shared media, to again provide a meaningful understanding of the audio content beyond standard dictionary definitions. Here again, this benefit lies in how words may refer to vastly differing meanings depending on the context.

Cognitive interpretations may also be conducted on the images of the shared media themselves, to again provide a meaningful understanding. In this case, the cognitive interpretation of shared video, for example, may be beneficial to determine actions being taken in both the foreground and the background of the shared video. These aspects may come into importance as in many scenes the activity taking place in the background may be as important as the actions taking place in the foreground. In one embodiment, a temporal alignment process will be conducted and assist in the overall analysis and interpretation of the shared media.

From the social interaction tracking and cognitive data collection and analysis operations previously just described in step 518, there may be situations where many similar comments, social interactions, and/or aspects of the shared media are found. In order to reduce storage utilization, and enhance the viewing experience for a user, these instances may be distilled to what are labeled as "unique instances."

As part of what will become a data deduplication operation applied to the individual portions of the social interactions, the number of unique instances in a particular set of social interactions and/or shared media are tracked. Those social interactions that are determined to be similar enough in various aspects to be "duplicates" may then be deduplicated, or the duplicate social interaction may be removed. The number of unique instances also assists in the weighting of social interactions from the standpoint of relevancy and popularity. In one embodiment, social interactions may be analyzed across differing shared media (e.g., different videos). In this way, the detection of inappropriate, repetitive (i.e., spamming) comments, and irrelevant comments may be identified. These social interactions may then be removed from consideration and display.

In addition to tracking social interactions across differing shared media, the user's interest may also be tracked across the social media platform. For example, the user may be determined to have a bigger interest in shared media concerning gardening techniques than shared media concerning archery. These use preferences may allow the system to give additional weight to certain social interactions, certain shared media, and/or portions thereof.

In one embodiment, overall interest in particular shared media may be tracked by way of "favorites" and "likes" being applied to unique instances within the media, as well as the deduplicated repeat of analyzed social interactions. The data gathered from the user interest can then be compared against the data gathered from the overall media interest. If a correlation is found, regression can be used to calculate the probability of the user's interest in that particular social interaction.

In addition to the foregoing, based on various preferences, such as those gleaned from the user profile, previously analyzed activities, and other preferences, specific social interactions may be filtered so as not to display to particular users. In other words, those social interactions deemed to be most applicable and desired by the user may be selected by the system for display to a particular user.

In some embodiments, an anti-spam filter may be applied to the social interactions to reduce irrelevant information. In other embodiments, other filters may be applied as will be appreciated by one of ordinary skill in the art, and as will be further described. For example, based upon data from the user profile, previous activities, and preferences; specific comments may be filtered so as not to display to particular users. The comments deemed to be most applicable and desired by the user will be selected. Once the social interactions are analyzed, weighted, filtered, and ordered, the social interactions may be displayed in any manner or fashion, including traditional comment display under video, or more advanced rendering methods according to a particular situation.

In some embodiments, for users with appropriate video capture/camera capabilities, facial recognition/expression and eye tracking analysis may also be incorporated to assist in weighting individual social interactions. For example, biometric information may be obtained to indicate whether a user retains interest, her interest is piqued, or her interest wanes during the viewing of certain shared media content or viewing and/or participating in social interaction.

Step 520 indicates various portions of the analysis previously mentioned, where social interaction, following the cognitive operations performed and data obtained, is then appropriately deduplicated, filtered, and the remaining interactions weighted. Once the relevant, qualified social interactions are identified, then another illustrated set of functionality occurs as various conditions present and identified in the social interaction are identified and extracted from the commentary in step 522. The system determines in the depicted embodiment that the selected relevant comment should be displayed at timestamp 2:33 to the user in step 524. The system compares the extracted conditions with those analyzed from the shared media in real time. If the conditions are present in the shared media (decision step 526), then the appropriate social interaction (in this case, comment) 532 is displayed (step 528) as comment 530, in conjunction and concurrently with the shared media 502. If, however the conditions are not currently present, then the system may hold the comment (step 534) until the conditions are deemed present, or the system may discard the comment.

It should be noted that the display of the comment 530 as shown concurrently and in conjunction with the shared media 502 incorporates additional display functionality according to the mechanisms of the illustrated embodiments that will be further described, following. As will be shown in additional illustrated embodiments, the functionality for concurrent display of the shared media 502 and comment 530 incorporates additional analysis, such that the display of the appropriate, relevant social interaction is also displayed for the appropriate duration in the appropriate location in the display 506, such that the display of the social interactions does not obfuscate viewing of any of the content of the shared media 502.

Figure 6:
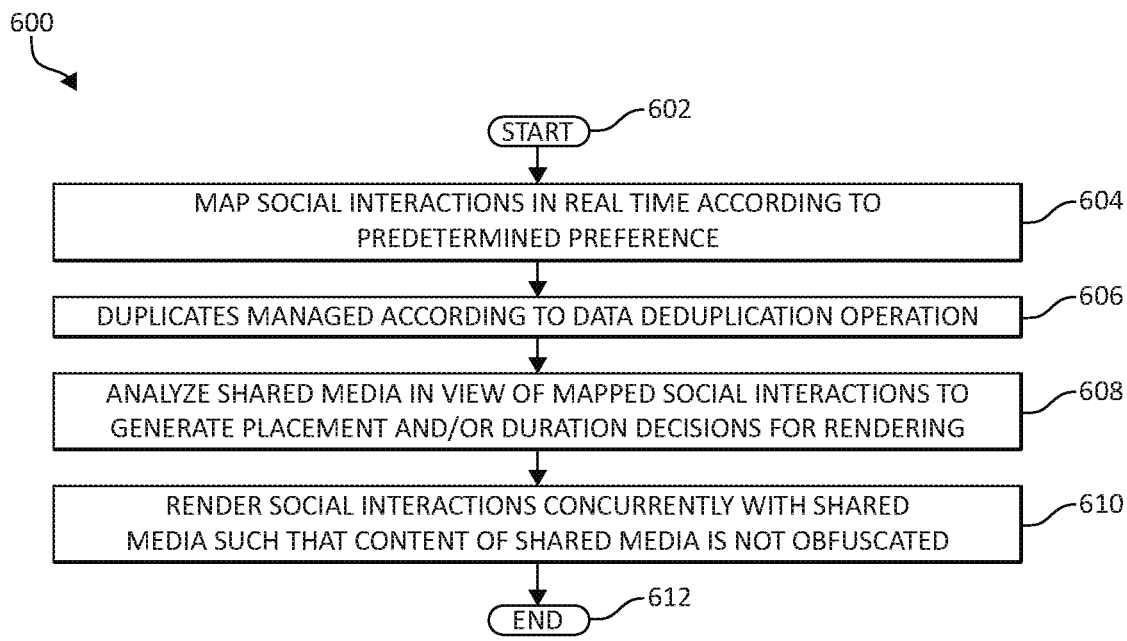
FIG. 6 is an additional flowchart diagram depicting an exemplary method for insertion of social commentary into shared media by a processor, in which various aspects of the illustrated embodiments may be realized.

Turning first to FIG. 6, an exemplary method 600 is depicted for insertion and display of social interactions in shared media by a processor, here again in which various aspects of the illustrated embodiments may be realized. Method 600 begins (step 602) with the mapping of social interactions in real time according to a predetermined preference (step 604). Those social interactions determined to be similar enough to be duplicate interactions are then managed according to a data deduplication operation (step 606).

In a subsequent step 608, the shared media is analyzed in view of the mapped social interactions to generate placement and/or duration decisions for rendering the content of the social interactions to a user on a particular display. Accordingly, once the display decisions are made, the social interactions are then rendered concurrently with shared media such that the content of the shared media is not obfuscated (step 610). The method 600 then ends (step 612).

Figure 7:
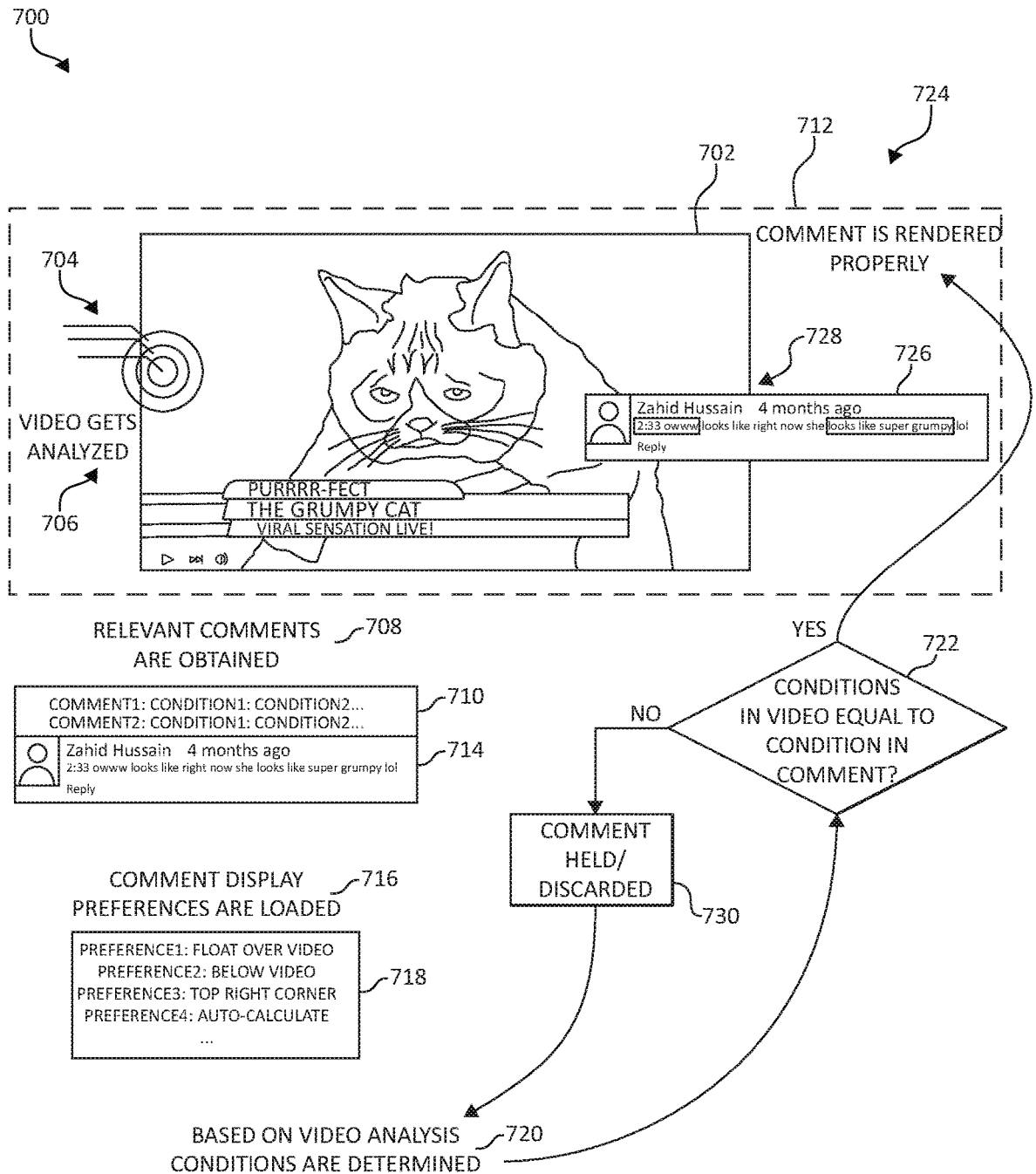
FIG. 7 is an additional block/flow diagram depicting an exemplary flow of insertion of social commentary into shared media by a processor, again in which various aspects of the illustrated embodiments may be realized.

FIG. 7, following, is an additional block/flow diagram depicting various aspects 700 of the present invention, including functionality for injection/integration of social interactions with shared media by a processor. Here, as in FIG. 5, previously, a shared media 702 topic is being delivered to a user in a particular display 712. In the depicted embodiment, the shared media itself is analyzed in step 706 for various characteristics 704 that may influence, for example, the way a particular social interaction should be displayed to the user, such as location, duration, style, or other features. Here, as before, overall video interest in the shared media may be tracked by way of "favorites" and "likes" being applied to unique instances within the shared media, as well as the identified and determined duplicated repeat of social interactions. Those social interactions identified as relevant pursuant to various analysis such as those previously mentioned (e.g., weighting operations etc.) are obtained in step 708.

Each of the social interactions may be analyzed in terms of the individual social interaction (e.g., 714) along with integrated conditions (shown by 710). In a subsequent step, various social interaction preferences, such as user display preferences may be obtained (step 716). The various display preferences options may include, in the depicted example, floating the social interactions over shared media, rendering the social interactions below the shared media, rendering the social interactions at the top right corner of the shared media, or auto-calculation of an appropriate display aspect (shown by block 718).

Based upon data from the user profile, and preferences; specific social interactions may be filtered so as not to display to particular users, as will be further described. Social interactions can be selected prior to playing the shared media, or optionally provided by an external source. In one embodiment, based upon user profile settings, social interactions from specific commenters may be selected. Other preferences may also be used to select specific social interactions (represented by step 720).

The selected social interactions may then be further analyzed in terms of how the social interactions can best relate temporally to the shared media. As previously described in FIG. 5, previously, the social interactions, a time stamp may then be applied to each selected social interaction. If, in one embodiment, a pre-determined comment position preference has been identified by the user, the selected social interactions will be placed accordingly as the social interactions align with a corresponding temporal location within the video. If no pre-determined comment position preference has been identified, locations within the shared media may then be analyzed for the best comment placement location that does not detract from the context of the shared media.

In one embodiment, display durations of the social interactions may be determined based on comment length, and a minimum and maximum display duration may be assigned for each comment. "Best" placement locations may be determined by analyzing temporal segments of the video to ensure comment placement and comment duration does not result in obfuscation of the video content. If, as previously and similarly described in FIG. 5, the various display conditions are determined to match the conditions found in the individual social interaction (decision step 722), then the social interaction is then rendered in step 724 concurrently with and/or within the shared media (designated by media set 728, illustrating both shared media shown alongside comment 726) on the particular display 712.

Returning to step 722, if in real time, the particular condition in the video does not match that and/or those in the particular social interaction, then the system may hold the social interaction in step 730 until that condition/those conditions are met, and the particular social interaction is rendered for the user. Alternatively, the system may discard the comment in a particular scenario (e.g., the comment contains a condition that has been determined to not present itself for the remaining duration of the shared media).

Figure 8:
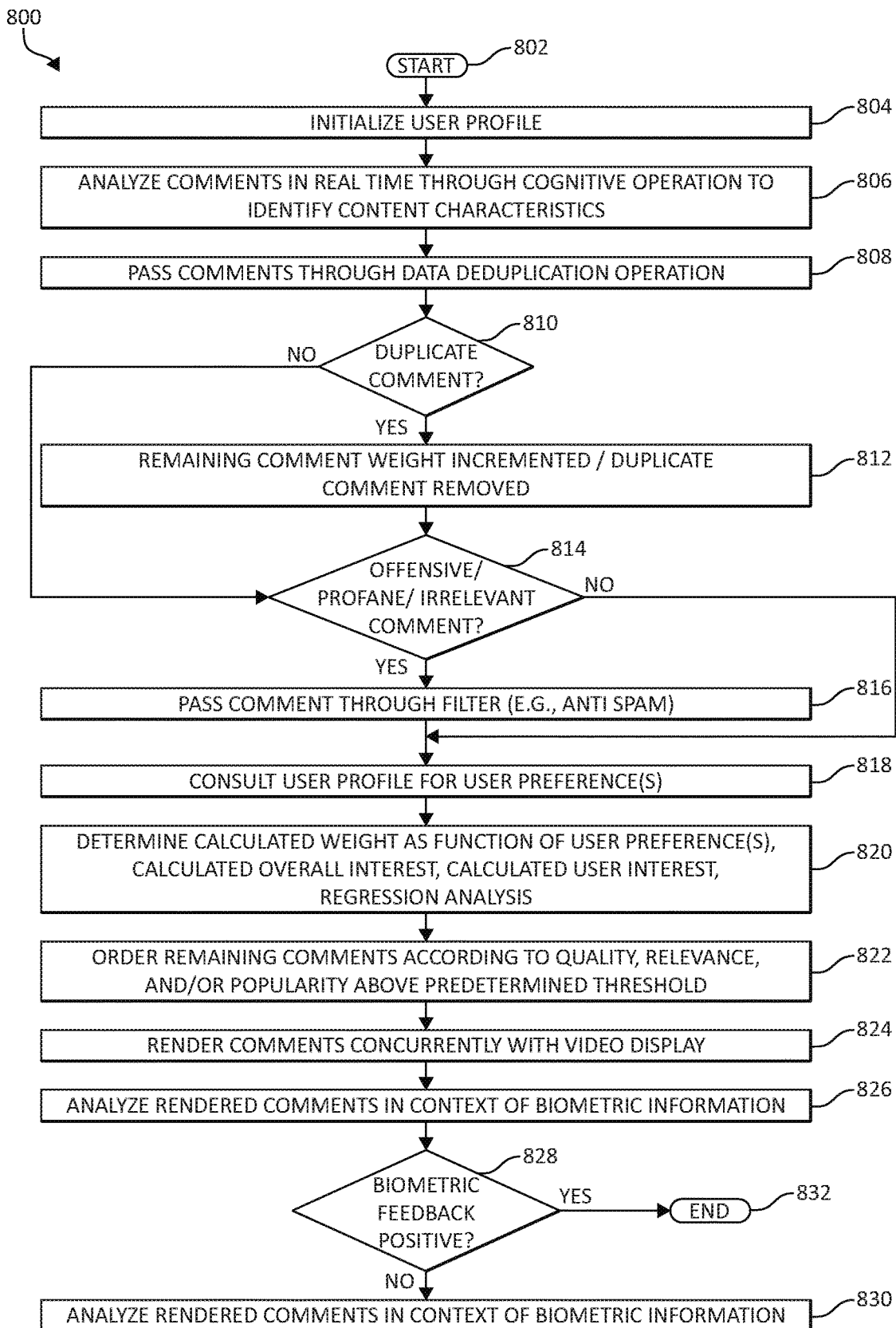
FIG. 8 is an additional flowchart diagram depicting an exemplary method for integration of social interactions and shared media content by a processor, again in which various aspects of the illustrated embodiments may be realized.
Figure 9:
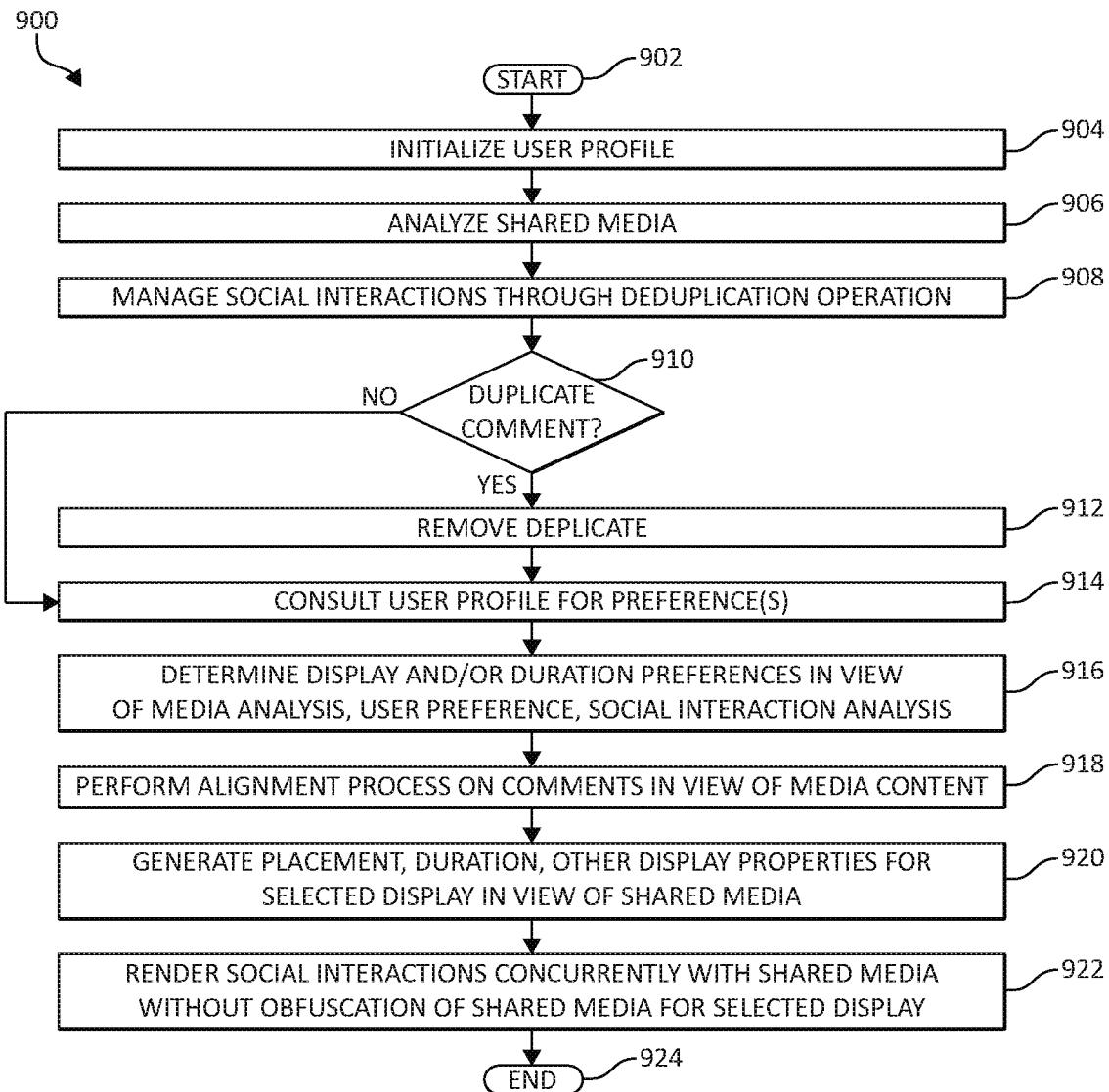
FIG. 9 is an additional flowchart diagram depicting an exemplary method for insertion of social commentary into shared media content by a processor, again in which various aspects of the illustrated embodiments may be realized.

Turning now to FIGS. 8 and 9, following, additional flowchart diagrams showing methods 800 and 900 are provided to further illustrate various aspects of the present invention, including analyzing social interactions, deduplication of those social interactions determined to be similar enough to warrant such an operation, analysis of shared video, use of preferences, including user preferences obtained from a user profile, and other inventive aspects.

First, turning to FIG. 8, method 800 begins (step 802) with the initialization of the user profile (step 804). A user may enter, or otherwise provide demographic information, preference information (e.g., as to display preferences, content preferences, style, context, or other preferences), and the like. The profile information may be stored, for example in a data repository in one or more distributed computing components within a cloud-based computing environment such as that previously depicted.

In a subsequent step, social interactions (in the depicted example, various comments regarding a posted video) are analyzed in real time through a cognitive operation to identify various content characteristics in a manner described previously (step 806). The comments are then passed through a data deduplication operation to rate those comments in terms of similarity, weed out duplicate comments and identify unique instances as previously described (step 808). One of ordinary skill in the art will appreciate that the data deduplication operation performed on the comments may proceed in a manner similar to those current procedures performed in other data storage scenarios, in local or distributed computing environments, etc.

If a comment is found to be duplicate in decision step 810, the duplicate comment is then removed, and the appropriate weight of the remaining comment is incremented to indicate the comment's popularity and/or relevancy, for example (step 812). As previously mentioned, other analyses may occur on the social interactions, where determinations as to relevancy, popularity, quality, or other characteristics may take place. If the comment is determined to not meet a predetermined threshold for these characteristics, such as a predetermined threshold of comment quality (based on a pre-set quality algorithm, for example), or relevancy, or contain offensive or profane material not in accordance with a user preference, for example, or the comment has been analyzed to be repetitive across other shared media (e.g., to indicate that the comment is spam) (decision step 814), then the comment is passed through a various filter (e.g., an anti-spam filter) and eliminated from consideration in step 816.

Throughout this process, and while depicted as a subsequent step in step 818, the user profile may be consulted for various preferences to provide additional context to a final calculated weight of any individual set of comments. This calculated weight may be a combined function of the user preference(s), quality, relevance, duplicity, other measured characteristics, and other factors that are measurable through the cognitive process previously mentioned and calculable in an algorithm. In the depicted embodiment, the calculated weight for a particular comment may be a function of user preferences, calculated overall interest in the shared media, calculated user interest (i.e., in the instant shared media and/or over a number of shared media), and regression analysis (step 820).

Once the foregoing analysis is made, the remaining comments may be ordered according to the various factors, such as by determined quality, relevance, and/or popularity above a predetermined threshold (step 822). In addition, the comments may be organized in terms of the various conditions found in both the comments and the shared media. For example, a condition may be noted in an individual comment that another user commented about a beauty mark on the snout of a particular pet dog that many users have commented as "cute." This condition has been analyzed to appear in the shared at a specified time. Accordingly, the system then organizes the relevant beauty mark comments that have been selected for display to this particular user to appear at approximately the identified specified time in the shared media.

At the determined time, the selected comment(s) are then rendered to the user concurrently with the video on the particular display (step 824). The rendered comments may then be analyzed in the context of collected biometric feedback from the user (e.g., eye tracking, audio and visual cues, etc.) (step 826). If the biometric feedback is determined to be positive (e.g., the user's interest continues to remain active or is piqued) (step 828), then the method ends (step 832). Alternatively, the method 800 may reorder, insert other comments, and/or eliminate comments per the biometric analysis in real time (step 830), returning to step 826 to re-analyze the user's biometric information for additional feedback.

Turning now to FIG. 9, an additional flowchart diagram of an exemplary method 900 for insertion/integration/concurrent display of social interactions with shared media is depicted, here again in which various aspects of the illustrated embodiments may be realized. Method 900 begins (step 902) with the initialization of the user profile, as previously described. In a subsequent step 904, the shared media (e.g., video) is analyzed for various preferences (step 906), and the associated social interactions are managed through a deduplication operation (step 908). If similar social interactions are determined such that they are duplicates (decision step 910), the duplicates are removed (step 912).

In a subsequent step, the initialized user profile is consulted for one or more preferences (step 914) that the user has saved, or the system may have learned over time by watching and recording various user behaviors, for example. The appropriate display (e.g., location, duration, style, placement, etc.) parameters are then determined in view of the shared media analysis, user preferences information, social interaction analysis, or other factors (step 916).

An alignment process is the performed on the shared video and social interactions (i.e., media set) in view of the display decisions that were generated (step 918). Various placement, duration, or other display properties for a particular display (e.g., taking into consideration resolution, video quality, screen size, computational requirements of the shared media and available hardware and software resources) are then generated (step 920). The social interactions are then rendered concurrently with the shared media in the appropriate placement, duration, location, and other qualities to provide an enhanced viewing situation for the particular user, but without obfuscation of the content of the shared media at a particular time (step 922). The method 900 then ends (step 924).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A system for integration of social interactions in shared media in a distributed computing environment comprising:

a processor, operational within and between the distributed computing environment, that:

receives the shared media comprising a video hosted on a social media platform, renders the video within a window of a user interface on a particular display associated with the user, during the rendering of the video within the window of the user interface, receives the social interactions comprising user-submitted comments associated with a context of the video, maps the social interactions in real time during the rendering of the video according to a predetermined preference; wherein duplicate ones of the social interactions are managed according to a data deduplication operation, responsive to mapping the social interactions in real time during the rendering of the video, analyzes the shared media in view of the mapped social interactions to generate placement and duration display attributes for the social interactions to concurrently display the user-submitted comments and content of the video within the window of the user interface without obfuscating the content of the video at a particular time during the rendering thereof, wherein analyzing the shared media includes performing a cognitive analysis of the content of the video to ascertain topic and presentation style characteristics associated with the context;

commensurate with generating the placement and duration display attributes, dynamically modifies, in real time throughout a duration of the rendering of the video, a position in two-dimensional space within the window of the user interface, relative to the content of the video while being rendered, in which each of the social interactions are rendered, wherein the position in two-dimensional space within the window of the user interface is determined according to an auto-calculation of a display aspect performed on the content with respect to each of the social interactions selected to be displayed at the particular time, and wherein the placement and duration display attributes further define and modify, in real time, a duration of time each of the social interactions are displayed at the position in two-dimensional space within the window of the user interface based on a comment length of each of the social interactions, and responsive to analyzing the shared media, determines whether a particular condition of the content of the video at a given point in time during the rendering of the video is contextually relevant to commentary of the social interactions submitted at the given point in time according to the cognitive analysis; wherein, if the commentary of one of the user-submitted comments is not contextually relevant to the content of the video at the given point in time, the one of the user-submitted comments is withheld from being displayed until a time during the rendering of the content in which the particular condition is met.

2. The system of claim 1, wherein the processor displays the mapped social interactions and the shared media concurrently on the particular display as an integrated media set according to the placement or duration display attributes.

3. The system of claim 2, wherein the processor performs a temporal alignment process on the integrated media set in real time.

4. The system of claim 1, wherein the processor, pursuant to mapping the social interactions in real time according to the predetermined preference, tracks a number of times an identified one of the social interactions is repeated.

5. The system of claim 1, wherein the processor records a user profile inclusive of the predetermined preference.

6. The system of claim 5, wherein the processor maps the social interactions subsequent to determining the predetermined preference by examining the user profile.

7. The system of claim 6, wherein the predetermined preference is a placement positional preference, and the processor displays the mapped social interactions according to the placement positional preference.

8. The system of claim 1, wherein the processor utilizes the predetermined preference to determine one of the placement or duration display attributes for the social interactions.

9. The system of claim 1, wherein the processor identifies a minimum and a maximum display duration for one of the mapped social interactions.

10. The system of claim 1, wherein the processor analyzes the shared media to determine an elapsed time of the shared media in which to integrate and display one of the mapped social interactions.

11. A computer program product for integration of social interactions in shared media in a distributed computing environment by a processor, the computer program product comprising a non-transitory computer-readable storage medium having computer-readable program code portions stored therein, the computer-readable program code portions comprising:

an executable portion that receives the shared media comprising a video hosted on a social media platform;

an executable portion that renders the video within a window of a user interface on a particular display associated with the user;

an executable portion that, during the rendering of the video within the window of the user interface, receives the social interactions comprising user-submitted comments associated with a context of the video;

an executable portion that maps the social interactions in real time during the rendering of the video according to a predetermined preference; wherein duplicate ones of the social interactions are managed according to a data deduplication operation;

an executable portion that, responsive to mapping the social interactions in real time during the rendering of the video, analyzes the shared media in view of the mapped social interactions to generate placement and duration display attributes for the social interactions to concurrently display the user-submitted comments and content of the video within the window of the user interface without obfuscating the content of the video at a particular time during the rendering thereof, wherein analyzing the shared media includes performing a cognitive analysis of the content of the video to ascertain topic and presentation style characteristics associated with the context;

an executable portion that, commensurate with generating the placement and duration display attributes, dynamically modifies, in real time throughout a duration of the rendering of the video, a position in two-dimensional space within the window of the user interface, relative to the content of the video while being rendered, in which each of the social interactions are rendered, wherein the position in two-dimensional space within the window of the user interface is determined according to an auto-calculation of a display aspect performed on the content with respect to each of the social interactions selected to be displayed at the particular time, and wherein the placement and duration display attributes further define and modify, in real time, a duration of time each of the social interactions are displayed at the position in two-dimensional space within the window of the user interface based on a comment length of each of the social interactions; and an executable portion that, responsive to analyzing the shared media, determines whether a particular condition of the content of the video at a given point in time during the rendering of the video is contextually relevant to commentary of the social interactions submitted at the given point in time according to the cognitive analysis; wherein, if the commentary of one of the user-submitted comments is not contextually relevant to the content of the video at the given point in time, the one of the user-submitted comments is withheld from being displayed until a time during the rendering of the content in which the particular condition is met.

12. The computer program product of claim 11, further including an executable portion that displays the mapped social interactions and the shared media concurrently on the particular display as an integrated media set according to the placement or duration display attributes.

13. The computer program product of claim 12, further including an executable portion that performs a temporal alignment process on the integrated media set in real time.

14. The computer program product of claim 11, further including an executable portion that, pursuant to mapping the social interactions in real time according to the predetermined preference, tracks a number of times an identified one of the social interactions is repeated.

15. The computer program product of claim 11, further including an executable portion that records a user profile inclusive of the predetermined preference.

16. The computer program product of claim 15, further including an executable portion that maps the social interactions subsequent to determining the predetermined preference by examining the user profile.

17. The computer program product of claim 16, wherein the predetermined preference is a placement positional preference, and further including an executable portion that displays the mapped social interactions according to the placement positional preference.

18. The computer program product of claim 11, further including an executable portion that utilizes the predetermined preference to determine one of the placement or duration display attributes for the social interactions.

19. The computer program product of claim 11, further including an executable portion that identifies a minimum and a maximum display duration for one of the mapped social interactions.

20. The computer program product of claim 11, further including an executable portion that analyzes the shared media to determine an elapsed time of the shared media in which to integrate and display one of the mapped social interactions.

* * * * *